Figure 5:
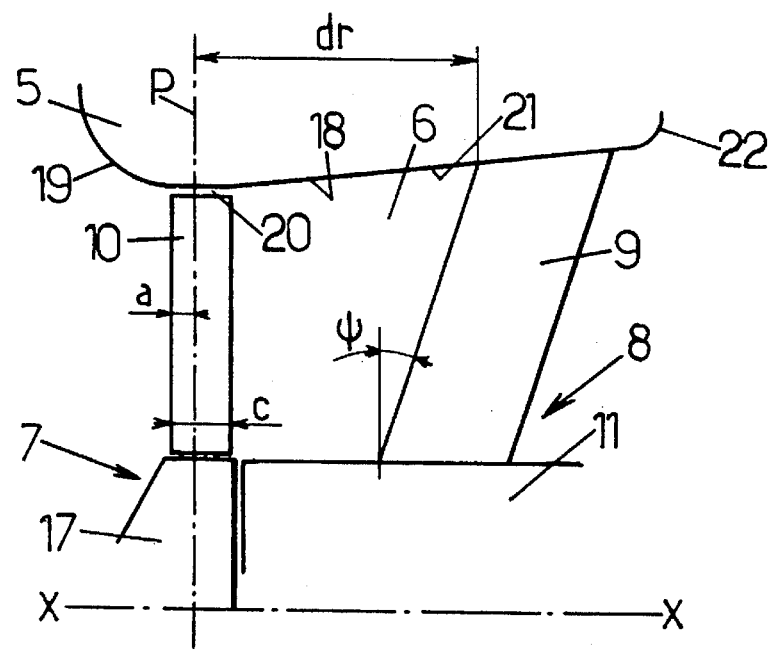

United States Patent [19]
Marze et al.

[11] Patent Number: 5,566,907
[45] Date of Patent: Oct. 22, 1996

[54] COUNTER-TORQUE DEVICE WITH DUCTED ROTOR AND PHASE MODULATION OF THE BLADES, FOR HELICOPTER

[75] Inventors: Henri-James R. Marze, Rognac; Vincent J. L. Routhieau, Aix-En-Provence; Gilles L. Arnaud, Marseille; Rémy E. Arnaud, Vitrolles, all of France

[73] Assignee: Eurocopter France, Marignane Cedex, France

[21] Appl. No.: 298,555

[22] Filed: Aug. 30, 1994

[30] Foreign Application Priority Data

May 4, 1994 [FR] France .................................. 94 05477

[51] Int. Cl.$^6$ ................................................ B64C 27/82
[52] U.S. Cl. ....................... 244/17.19; 244/1 N; 415/119
[58] Field of Search ............................. 244/1 N, 17.11, 244/17.19, 17.21; 415/119, 210, 217, 209, 142, 148, 149 R, 150, 213 C; 416/123; 60/269

[56] References Cited

U.S. PATENT DOCUMENTS

| | | |
|---|---|---|
| 3,594,097 | 7/1971 | Mouille et al. . |
| 3,747,343 | 7/1973 | Rosen ........................................ 415/119 |
| 4,585,391 | 4/1986 | Vuillet . |
| 4,626,172 | 12/1986 | Mouille et al. . |
| 4,626,173 | 12/1986 | Mouille et al. . |
| 4,809,931 | 3/1989 | Mouille et al. . |
| 5,131,604 | 7/1992 | Yoerkie et al. . |

FOREIGN PATENT DOCUMENTS

| | | | |
|---|---|---|---|
| 233501 | 8/1987 | European Pat. Off. ............... | 415/119 |
| 0562527 | 3/1993 | European Pat. Off. . | |
| 1531536 | 5/1968 | France . | |
| 2534222 | 10/1982 | France . | |
| 2622170 | 10/1988 | France . | |
| 321303 | 10/1934 | Italy ........................................ | 415/119 |
| 726358 | 4/1980 | U.S.S.R. ............................... | 415/119 |
| 983469 | 2/1965 | United Kingdom ................... | 415/119 |
| 992941 | 5/1965 | United Kingdom ................... | 415/119 |

OTHER PUBLICATIONS

Proceedings of the nineteenth european rotorcraft forum 14 Sep. 1993, Cernobbio (Italy) : "A new generation of fenestron fan-in-fin tail rotor on EC 135".

"Noise Reduction by Applying Modulation Principles" by Donald Ewald et al, published in The Journal of Acoustical Society of America, vol. 49, No. 5, 1971, pp. 1381 to 1385.

Primary Examiner—Galen L. Barefoot
Attorney, Agent, or Firm—Larson and Taylor

[57] ABSTRACT

The blades of the rotor which can rotate in the transverse duct have an angular distribution according to an uneven azimuth modulation given by the following sinusoidal law:

$$\Theta n = n \times 360°/b + \Delta\Theta \sin(m \times n \times 360°/b)$$

where $\Theta n$ is the angular position of the nth of the blades counted in series from an arbitrary origin, b is the number of blades, m is a whole number chosen from 1 to 4, which is not prime with the number b of blades, chosen from 6 to 12, and $\Delta\Theta$ is chosen to be greater than or equal to a minimum value $\Delta\Theta$ min, which is such that the product $\Delta\Theta$ min×b is chosen within a range of values extending from 1.5 radian to 1 radian.

18 Claims, 3 Drawing Sheets

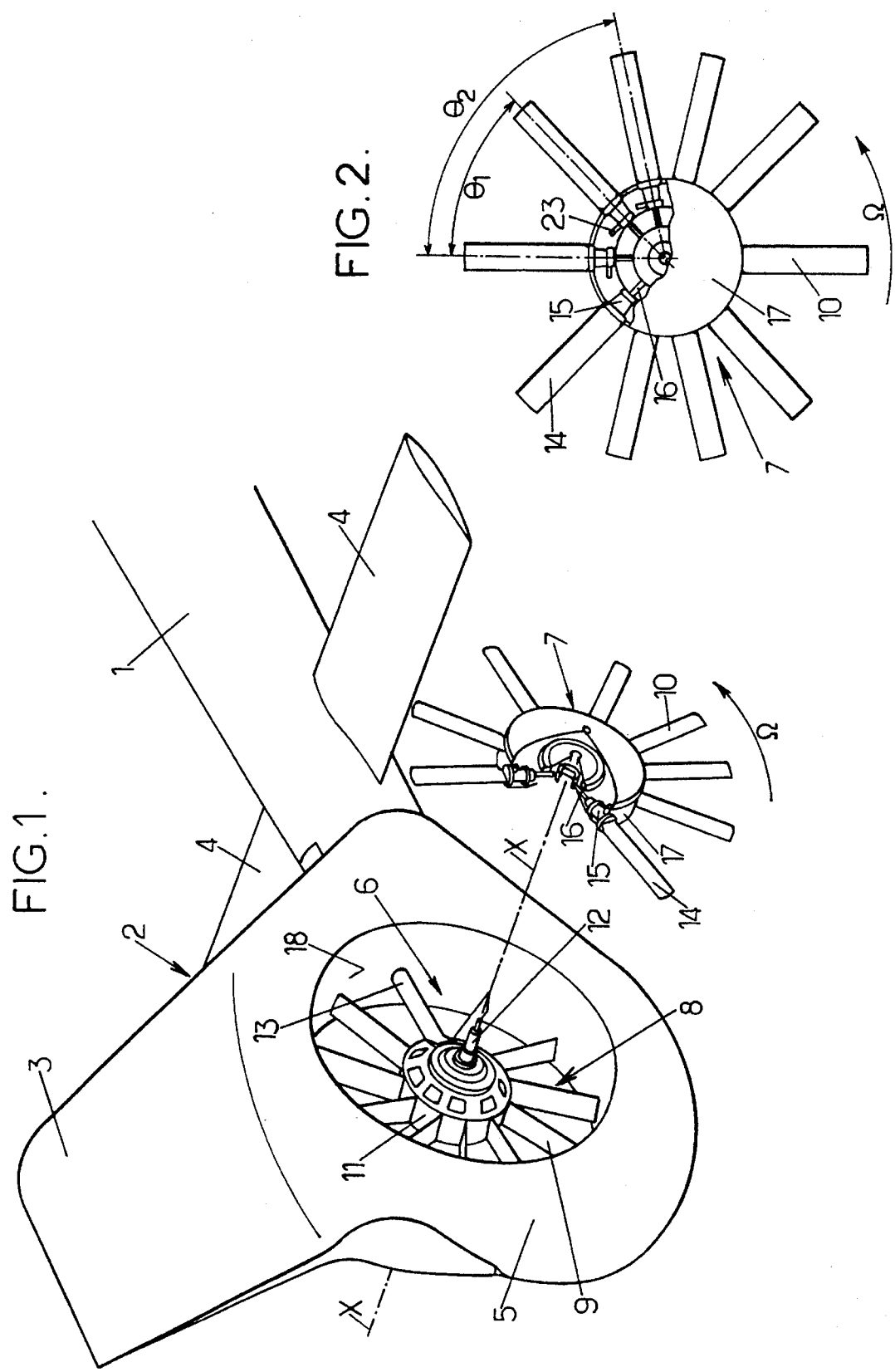

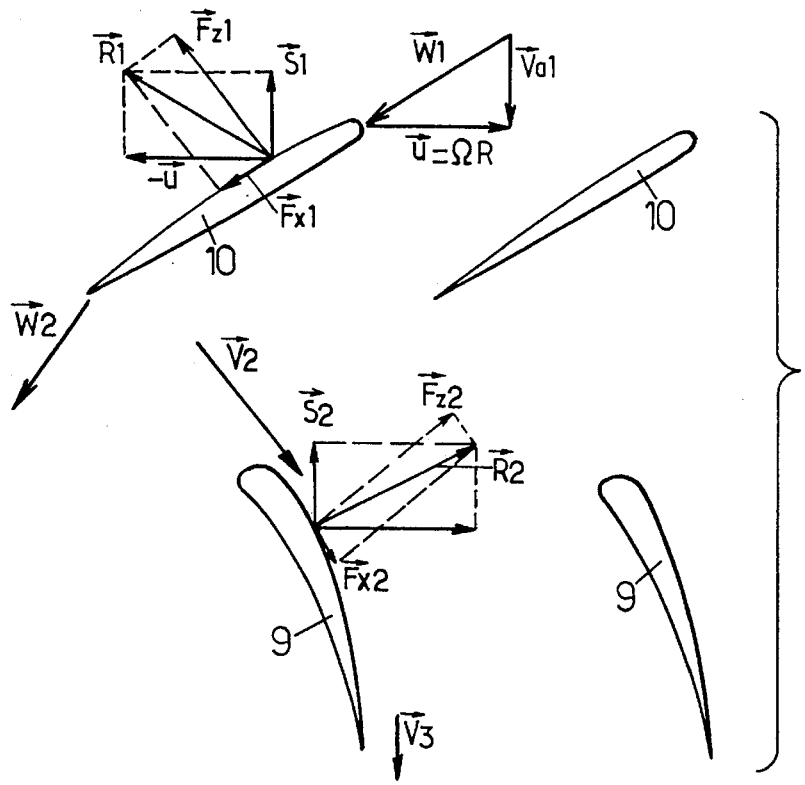
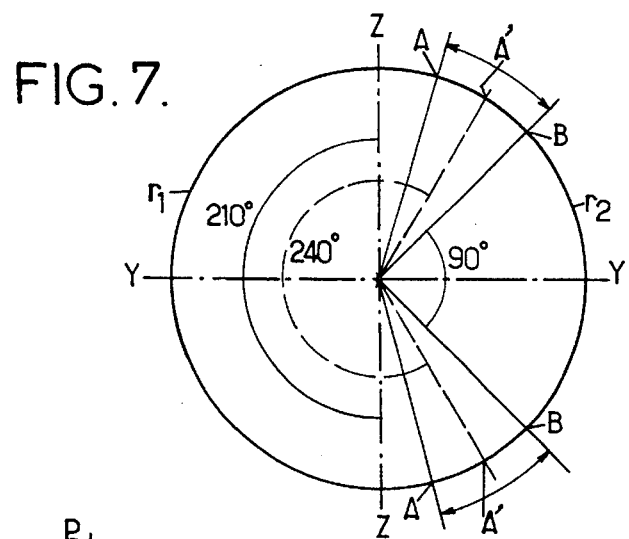
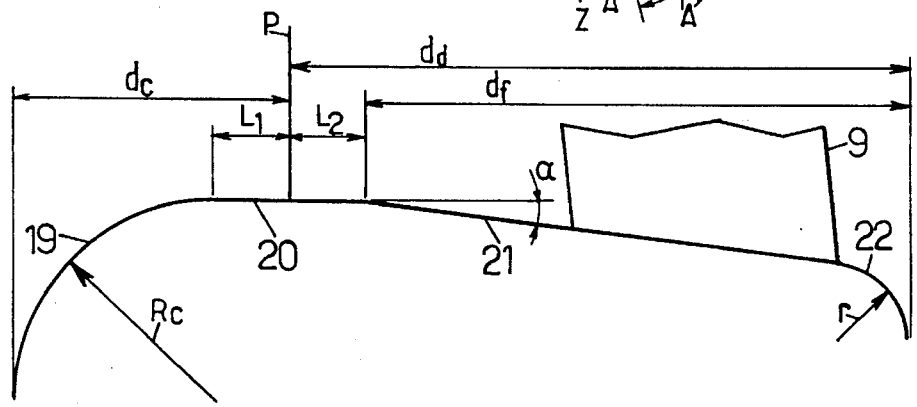
FIG. 3.
FIG. 7.
FIG. 6.

3,566,907

COUNTER-TORQUE DEVICE WITH DUCTED ROTOR AND PHASE MODULATION OF THE BLADES, FOR HELICOPTER

The invention relates to counter-torque devices with ducted tail rotor and phase modulation of the blades, for a helicopter, and applies especially to devices of this type in which a flow-straightening stator comprising stationary vanes with aerodynamic profile is fixed downstream of the rotor in the duct for flow of air formed transversely in the fairing incorporated into the structure of the tail assemblies of a helicopter, such as the tail boom, the empennage or a stabilizer. The improvements made by the invention to counter-torque devices of these types enable their acoustic and/or aerodynamic performances to be improved, in order to procure a significant reduction in the noise and associated acoustic nuisance as well as better control in yaw, respectively.

It is known that the balancing in terms of yaw of helicopters with a single main rotor, obtained by countering the torque created by the rotation of the main rotor may be provided by means of a ducted counter-torque rotor inside a transverse duct in the tail part of the helicopter rather than, in the conventional manner, by means of an external tail rotor mounted laterally on the empennage, at the upper end of the latter.

The structure and arrangement of such a ducted counter-torque rotor, of the means for rotationally driving it, of the means for collective pitch control of its blades, as well as the advantages of such an embodiment have been laid out in numerous patents, among which mention may be made of the French Patents FR 1 531 536 and FR 2 534 222 (or U.S. Pat. No. 4,585,341) (relating to a counter-torque device with ducted rotor and ducted flow-straightening stator) and the American Patents U.S. Pat. No. 3,594,097, U.S. Pat. No. 4,809,931, U.S. Pat. No. 4,626,172 and U.S. Pat. No. 4,626,173, and American Patent U.S. Pat. No. 5,131,604, to which reference will advantageously be made for more information on this subject.

We will content ourselves with recalling that, from the safety standpoint, a ducted counter-torque rotor prevents any risk of physical injury on the ground, owing to the fact that it is protected inside the duct in the tail boom, unlike a conventional tail rotor. This arrangement of the ducted counter-torque rotor also enables it to avoid ingesting any damage-causing object which may be drawn into the wake of the main rotor. In flight or when manoeuvring close to the ground or on the ground, the ducted counter-torque rotor is naturally protected by its fairing, which prevents any risk of impact with external obstacles such as electric lines, branches, buildings or even the ground, which may give rise to fatal damage to a conventional tail rotor, and therefore to the loss of the helicopter, with all the consequences which stem therefrom for the crew. Finally, the smaller surface area of the rotor disc and the higher number of blades of a ducted counter-torque rotor by comparison with a conventional tail rotor render the vulnerability of the former to impacts, such as military projectiles, much lower and less critical than on a conventional tail rotor.

From the aerodynamic standpoint, a ducted counter-torque rotor enables a certain number of problems manifested when equipping a helicopter with a conventional tail rotor to be eliminated. In this latter case, in order to create sufficient induced speed to recover a lateral thrust level necessary for the counter-torque function, the diameter of a conventional tail rotor is generally significant. In order to minimize the interactions with the wash of the main rotor and ensure sufficient ground clearance, a conventional tail rotor is generally mounted high up on the stabilizer, which creates a rolling moment on the helicopter, which has to be balanced, and generates parasitic drag in forward flight at high speed. Owing to its exposed position, a conventional tail rotor may be highly stressed by dynamic loadings which restrict its service life. In addition, the effect of aerodynamic shielding of a conventional tail rotor, due to masking by the stabilizer, gives rise to a highly asymmetric behaviour in a crosswind, and to detrimental impulsional periodic aerodynamic loadings.

A ducted tail rotor does not exhibit these drawbacks. In general, it can easily be arranged so that its axis substantially intersects the roll axis of the helicopter, or is close to this roll axis, so that it does not create any parasitic rolling moment. In addition, owing to its fairing, it produces approximately half of its total counter-torque thrust just by the phenomenon of suction by the collector, at the inlet of the duct which accommodates it. This makes it possible to unload correspondingly the blades of the rotor, which are subject to practically no dynamic stresses, owing to the effective protection afforded by the fairing with regard to external variations in the airflow, coming from the main rotor and from the fuselage of the helicopter. In forward flight at high speed of the latter, the ducted counter-torque rotor is unloaded, which correspondingly decreases its contribution to the overall drag of the machine. In this configuration, the vertical stabilizer, possibly equipped with a deflectable flap, fulfils the counter-torque function. In addition, no stabilizer or empennage control surface hinders the operation of the ducted counter-torque rotor, which gives it maximum efficiency in a crosswind and during rapid manoeuvres about the yaw axis.

The addition of a flow-straightening stator with profiled vanes downstream of the rotor and in the fairing duct of the latter, in order to recover the rotational energy of the airflow downstream of the rotor in the form of additional counter-torque thrust and thus to increase the aerodynamic performance of the counter-torque device, as described in French Patent FR 2 534 222 (or U.S. Pat. No. 4,585,341), enables the efficiency of a ducted tail rotor to be enhanced, and a figure of merit distinctly greater than that of the best conventional tail rotors to be achieved.

Finally, for a guided duct accommodating a ducted counter-torque rotor, the diffusion ratio is close to 1, and can be increased by increasing the angle of divergence of a frustoconical part of the diffuser that the duct may include downstream of the plane of rotation of the blades of the rotor, as described for example in the American Patent U.S. Pat. No. 5,131,604, in which this angle of divergence is limited to 5°. In contrast, contracting the wake on a conventional tail rotor fixes the diffusion ratio to ½, which prevents any improvement in performance by means of this parameter.

From the acoustic point of view, a ducted tail rotor draws further advantage from its positioning in a fairing duct:in contrast with a conventional tail rotor, which radiates noise in all directions, the detectability of a ducted tail rotor at the front and at the rear, in the direction of forward travel of the helicopter, is greatly reduced owing to the fairing. Moreover, the combination of a higher angular rotational speed $\Omega$ and of a higher number of blades b on a ducted counter-torque rotor than on a conventional tail rotor produces a "blade passage frequency" $b \times \Omega$ and its multiple frequencies $n\, b\, \Omega$ which are much higher acoustic energy concentration frequencies than for a conventional tail rotor, and typically within the field of the frequencies from 400 Hz to 2000 Hz. Now, these frequencies are very quickly attenuated in the atmosphere, whereas the very low acoustic energy concentration frequencies of a conventional tail rotor are propagated a long way.

However, one drawback of ducted counter-torque rotors is that raising the acoustic energy concentration frequencies level places these in a frequency zone where the human ear has maximum sensitivity. In addition, the very impulsive appearance of a ducted counter-torque rotor noise spectrum, for which most of the acoustic energy is concentrated on the very narrow first two or three lines of the spectrum, is manifested by a characteristic whistling noise which is very painful for the human ear, and which is highly penalized by the acoustic certification criteria by means of the "corrections of pure sounds or emergent lines". From the military standpoint, the characteristic acoustic signature of a ducted counter-torque rotor is also a prejudicial phenomenon, facilitating identification of the helicopter.

Independently of the distribution of acoustic energy over the field of frequencies, as mentioned above, the overall level of dissipated acoustic energy is the second main factor for assessing the quality of the acoustic level of a helicopter. As explained hereinabove, and mentioned more particularly in the American Patent U.S. Pat. No. 5,131,604, the aerodynamic operation of a ducted counter-torque rotor with a high number of blades and for which the counter-torque thrust is provided half by suction leads to a load per blade which is less than that withstood by the blades of a conventional tail rotor, and therefore a lower level of loading noise.

In contrast, the presence of fixed obstacles in the duct for fairing the counter-torque rotor, downstream of the latter, such as support arms of a rear transmission box associated with a mechanism for collectively controlling the pitch of the blades, for example, and on which the rotor is mounted so that it can rotate, or even such as a flow-straightening stator with fixed profiled vanes, for example, may greatly increase the level of radiated acoustic energy.

For this reason, U.S. Pat. No. 5,131,604 proposes for the three support arms to have an elliptical cross-section, one being radial and aligned with the longitudinal axis of the helicopter and the other two parallel to the vertical axis of the fairing, but offset towards the rear, the separation along the axis of the duct between the plane of rotation of the rotor and the support arms being from 2 to 2.5 times the minor axis of the ellipse of the cross-section of the arms. These shapes and arrangements make it possible substantially to decrease the lines of acoustic interactions between the rotor and the support arms, for an eight-bladed rotor, the peripheral speed of which is limited to approximately 225 m/s.

Moreover, in order to reduce the sound emission of propeller-driven aircraft, it has already been proposed by the French Patent FR 2 622 170 for the propeller to have an even number of blades, greater than or equal to four, the blades being diametrically opposed in pairs, and the pairs of blades being arranged offset with respect to each other with an angular separation pitch lying between approximately 15° and 50°, so that the levels of the harmonics of rotational noise are weakened by interference.

In order to reduce the sound emission of a helicopter ducted tail rotor, there has also been proposed, in European Patent Application EP 562 527, a non equi-angular distribution of the blades of the rotor. However, since this non equi-angular distribution may lead to structural impossibilities in terms of linking the blades to the hub of the rotor, without the blades together with their pitch-control lever interfering with one another, this document proposes non equi-angular distribution solely in combination with the grouping of the blades into two groups in which the pitch control levers have different angular settings, so that over part of the pitch range, the counter-torque thrust is mainly provided by one group of blades, whereas on the other part of the pitch range, it is mainly provided by the other group of blades, while the blades of the first group stall.

An object of the present invention is to propose improvements for producing a counter-torque device with ducted rotor of minimal acoustic nuisance, intended to equip a helicopter which is propelled by means of a single main rotor, while retaining, or even improving, the aerodynamic performance of the ducted counter-torque device by comparison with the known assemblies of this type.

Another object of the invention is to propose a law of angular distribution of the blades of the rotor, so as to distribute the acoustic energy as effectively as possible throughout the entire frequency spectrum, taking account of the limitations in mechanical possibilities as regards linking the blades to the hub of the rotor, and this being the case even when the counter-torque device comprises a ducted rotor which does not interact with a downstream flow-straightening stator.

In the case of the counter-torque device comprising a rotor and a flow-straightening stator, both of which are ducted, another object of the invention is to propose angular distributions for the blades of the rotor which take account of the angular distribution of the vanes of the flow-straightener, in order to prevent them from interacting directly and prevent the generation of noise which could stem therefrom.

Still in the case of a counter-torque device with rotor and flow-straightening stator, both of which are ducted, one object of the invention is to propose a configuration and/or an arrangement of the flow-straightener as a function of the geometry of the rotor in order to minimize the interaction noise, both while decreasing the radiated acoustic energy and avoiding the emergence of pure sounds in frequency ranges where the human ear has maximum sensitivity.

Another object of the invention is to propose a shrouded duct configuration improving the aerodynamic performance of the counter-torque device, whether the latter comprises a rotor with or without flow-straightening stator, and whether or not the blades of the rotor are equally distributed angularly, in order to increase the level of thrust for given power, and to decrease the noise caused by the flow of air through the duct.

In general, the object of the invention is to propose a counter-torque device with ducted rotor, and preferably also with ducted flow-straightening stator, which suits the various practical requirements better than the known ducted counter-torque devices.

The abovementioned aims, as well as others, are achieved, according to the invention, by a counter-torque device for a helicopter, comprising a variable-pitch multi-blade rotor mounted so that it can rotate substantially coaxially in a duct for a flow of air of axis substantially transversal to the helicopter and passing through a fairing incorporated into the tail part of the helicopter, so that the pitch change axes of the blades move in a plane of rotation substantially perpendicular to the axis of the fairing duct, the blades of the rotor having an angular distribution about the axis of the rotor with an uneven azimuth modulation, and which is characterized in that the azimuth modulation of the blades is substantially given by the following sinusoidal law:

$$\Theta n = n \times 360°/b + \Theta \sin(m \times n \times 360°/b)$$

where $\Theta n$ is the angular position of the nth of the blades of the rotor counted in series from an arbitrary origin, b is the number of blades of the rotor, m is a whole number chosen from 1 to 4, which is not prime with the number b of blades of the rotor, chosen from 6 to 12, and $\Delta\Theta$ is chosen to be greater than or equal to a minimum value $\Delta\Theta$ min, which is such that the product $\Delta\Theta$ min×b is chosen within a range of values extending from 1.5 radian to 1 radian.

The uneven angular spacing of the blades resulting from this sinusoidal law ensures an effective distribution across the frequency spectrum of the acoustic energy radiated by the set of rotating blades, which constitutes a main source of noise. The irregular angular separation of the blades thus proposed has the effect of decreasing the level of acoustic energy which is concentrated on the lines of frequencies b×$\Omega$ and its integer multiples, for a rotor with equally distributed blades, and of distributing it over the adjacent frequencies. The impulsive spectrum of the rotors with equally distributed blades is converted into a much richer spectrum with a rotor according to the invention, and the human ear no longer perceives a strong and painful pure sound, but a much more neutral noise. This sinusoidal law for angular distribution of the blades of the rotor simultaneously simplifies industrial implementation and acoustic efficiency, because the parameters m and $\Delta\Theta$ are chosen as a function of the number b of the blades in order at the same time to ensure dynamic balancing of the rotor, optimum distribution of the energy over the frequency spectrum, and to guarantee a minimal inter-blade angular separation, imposed by the conditions of angular excursion of the blades in terms of pitch and structural adherence to the hub of the rotor.

However, when application of the sinusoidal law does not make it possible to maintain an inter-blade angular separation greater than or equal to the minimal allowable separation for the aforementioned reasons, the aforementioned sinusoidal law may be distorted in order to give suitable azimuth modulation. A variation is then permitted about the angular position initially given to each blade of the rotor by the sinusoidal distribution law, and the angular position of at least one blade of the rotor varies by a maximum of ±5° with respect to the angular position fixed by the sinusoidal law, in order to preserve the efficiency inherent to modulation and cover the aforementioned constraints.

The counter-torque device may additionally comprise a ducted flow-straightening stator fixed into the duct downstream of the rotor and including stationary vanes located substantially in a star configuration about the axis of the duct and each exhibiting an asymmetric aerodynamic profile, of which the camber and the angular setting with respect to the axis of the duct are such that the vanes straighten out the airflow downstream of the rotor substantially parallel to the axis of the duct. In this case, the vanes of the flow-straightener may be distributed substantially evenly about the axis of the duct, and, regardless of the uneven azimuth modulation of the blades of the rotor, the device is furthermore such that any angle between two arbitrary blades of the rotor is different from any angle between two arbitrary vanes of the flow-straightener. Thus, in other words, there is no angular separation between two blades which are not necessarily consecutive of the rotor which is equal to any arbitrary angular separation between two vanes which are not necessarily consecutive of the flow-straightener.

Of course, respect of this geometric condition could advantageously be achieved by giving the blades of the rotor an initial angular position defined by the abovementioned sinusoidal distribution law then, if necessary, by distorting this law by permitting the abovementioned variation about the initial angular position until the abovementioned geometric condition is satisfied.

In effect, when using a flow-straightener downstream of the rotor, it is important to minimize the noise resulting from the interaction of the wake of each blade of the rotor with the obstacles which the vanes of the flow-straightener constitute. In particular, for the rotor, it is proposed to disrupt any blade-to-blade interaction correlation. In effect, such a correlation not only leads to total accumulation of the acoustic energy generated by the interaction of wake, because the phase shift from one source of interaction with respect to another is zero but, owing to the periodicity, concentrates all of this energy onto very narrow frequency bands which are multiples of one another. This results in the emission of a high-energy pure sound which the human ear does not tolerate well, and this phenomenon is heavily penalized by the acoustic certification regulations.

The technical solution corresponding to the abovementioned geometric condition ensures that two arbitrary blades of the rotor will never simultaneously pass opposite two arbitrary vanes of the flow-straightener.

It is noted that this geometric condition is the generalization, for an arbitrary circumferential arrangement of the blades of the rotor and of the vanes of the flow-straightener, of the geometric condition valid solely for equally distributed blade and vane arrangements and according to which the numbers of the blades of the rotor and of the vanes of the flow-straightener must be prime with each other.

The decrease in acoustic nuisance due to the interactions between the blades of the rotor and the fixed vanes of the flow-straightener is also obtained, and independently of the abovementioned angular distribution conditions and laws, by contriving for the level of acoustic energy emitted by these interactions to be decreased, whether or not this level is concentrated on certain frequencies. In order to avoid the interaction of the wake of an arbitrary blade of the rotor on an arbitrary vane of the flow-straightener arising simultaneously across the whole span of the vane, the vanes of the flow-straightener are arranged, according to the invention, in a non-radial fashion. Advantageously, they are each inclined to the radial direction, preferably by an angle of approximately 1° to approximately 25° from the axis of the duct towards its periphery, and in the opposite direction from the direction of rotation of the rotor. This orientation is simultaneously favourable to taking up the torque, which is exerted, as a reaction to the rotation of the rotor, on a central body substantially coaxial with the duct, containing the members for driving the rotor and the collective members for controlling the pitch of the blades of the latter, and which the vanes of the flow-straightener can thus advantageously support within the duct.

In order for the vanes to fulfil their function as support for the central body and their function for straightening out the airflow passing through the duct simultaneously under good conditions, it is advantageous for them to exhibit an aerodynamic profile of the NACA 65 type, with a relative thickness lying between approximately 8% and approximately 12%, an angular setting to the axis of the duct lying between approximately 2° and approximately 2.5°, orientated at a negative angle of attack, and a camber lying between approximately 20° and approximately 28°. The thickness thus chosen is a compromise between the smallest possible relative thickness, in order to decrease both the loading noise and the noise due to thickness of the flow-straightener operating in the wake of the rotating blades, and a sufficient thickness to hold the body supporting the rotor and containing the rear transmission box and collective pitch control for the blades, which are thus secured to the tail assembly of the helicopter, including the end of the tail boom and an empennage or a stabilizer of the helicopter, whilst being subjected to static and dynamic force fields.

In order to decrease overall the radiated acoustic energy, whether or not the vanes are inclined to the radial direction, it is advantageous for the vanes of the flow-straightener to be inclined at a slant, from the centre of the duct to its periphery and from upstream to downstream, preferably by an angle of approximately 1° to approximately 6°. This configuration, in which each flow-straightener vane forms a non-zero angle with respect to the plane of rotation of the blades of the rotor, while being inclined towards the outlet of the duct, makes it possible to increase the distance which separates the plane of rotation of the blades from the local position of the leading edge of the vanes of the flow-straightener at the periphery of the duct, where the vanes connect to the shrouded wall of this duct, and where the speed induced by the rotor in the wake is the highest, and therefore gives rise to a greater interaction on the flow-straightener than towards the root of the blades.

In order to obtain a good compromise between the level of radiated acoustic energy and the aerodynamic efficiency of the flow-straightener, and promote its arrangement in the duct of the counter-torque device, and in particular anchorage of its vanes into the shrouded wall of the duct, as well as to give good positioning of the rotor within the duct, by means of the rear transmission box supported in the latter by the vanes, the spacing, along the axis of the duct, between the plane of rotation of the rotor and the leading edge of the vanes of the flow-straightener, at the periphery of the duct, is advantageously a distance lying between 1.5 c and 2.5 c, where c is the chord of the blades of the rotor, measured level with the start of the profiled main blade section.

In addition, in order to reduce the interference between the rotor and a transmission arm, transmitting a driving power to the rotor, and passing through the duct as far as the rear transmission box, this arm is advantageously located inside the duct substantially at the location of one of the vanes of the flow-straightener, the profiled vanes of which are advantageously a number at least equal to the number of the blades of the rotor, decreased by one.

According to the invention, a decrease in the acoustic nuisance and an increase in the aerodynamic performance of a counter-torque device with ducted rotor may also be obtained by a specific geometric configuration of the duct, when the azimuth modulation of the blades is uneven or even, and regardless of whether or not the rotor is associated with a flow-straightener.

To this end, the duct comprises two parts, one of which is a collector, corresponding to that part of the duct which is situated upstream of the plane of rotation of the rotor, and the other of which is a diffuser corresponding to that part of the duct which is situated downstream of the plane of rotation of the rotor, the collector comprising a convergent inlet nozzle, delimited by an annular wall which is convex towards the upstream end and rounded with a constant radius Rc, and which is extended towards the plane of rotation of the rotor by a cylindrical zone of a first length L1, and the diffuser comprising, from the plane of rotation of the rotor towards the downstream end, a cylindrical zone of a second length L2, extending the cylindrical zone of the collector, then a frustoconical divergent nozzle of vertex half-angle α, and a divergent outlet delimited by an annular wall which is convex towards the downstream end and rounded with radius r.

The existence of the cylindrical duct part, formed by the cylindrical zones of the collector and of the diffuser, makes it possible to improve the aerodynamic operation of each of the profiles of the blades of the rotor, when the latter is mounted in the duct so that its blades rotate inside this cylindrical part, because the flow in this cylindrical part is axial.

Advantageously, the position of the plane of rotation of the rotor in this cylindrical part is defined as a function of the chord c of the blades of the rotor, of their positive pitch range, of the distance a between their leading edge and the pitch change axis, and the maximum deformation f of the blade, characterizing its rigidity in flap, so that the lengths L1 and L2 of the cylindrical zones are such that:

$$L1 > a \sin(\beta \max) + f \text{ and } L2 < (c-a) \sin(\beta \max),$$

where β max is the maximum positive pitch angle of the blades of the rotor.

In practice, it is advantageous for the lengths L1 and L2 of the cylindrical zones of the collector and of the diffuser respectively to lie respectively between approximately 2% and approximately 8%, and between approximately 1% and approximately 3.5% of the diameter of the duct measured in its cylindrical part.

Likewise, regardless of whether or not the duct includes a cylindrical part, as soon as it does include a collector with convergent inlet nozzle delimited by an annular wall which is convex and rounded with a constant radius Rc, this radius is approximately 8% of the diameter of the duct measured at its throat in its narrowest cross-section.

In order to increase the thrust for given power, or decrease the noise by decreasing the loading on the blades of the rotor, for fixed overall thrust, the angle of diffusion of the diffuser, or half-angle α of its frustoconical divergent nozzle, is preferably chosen between approximately 5° and approximately 20°.

In order to reduce the drag of a counter-torque device with ducted rotor in forward flight, without distorting the thrust provided by this counter-torque device, particularly in stationary flight, the Assignee Company has produced on its helicopters of models AS365 N1, marketed since 1985, an annular wall of the divergent outlet of the diffuser which has a first constant radius r1 over a circular arc extending towards the front of the helicopter, a second constant radius r2, greater than r1, over a circular arc extending towards the rear of the helicopter, and two zones with progressive radius between r1 and r2 connecting the zones of constant radius, symmetrically on either side of a longitudinal axis of the helicopter. According to the invention, r1 is preferably less than approximately 1.6% of the diameter of the duct, whereas r2 lies between 4.3% of the diameter of the duct and the radius Rc chosen for the convergent nozzle of the collector, and the front zone of constant radius r1 extends over a circular arc corresponding to a subtended angle of at least 210°, whereas the rear zone of constant radius r2 extends over a circular arc corresponding to a subtended angle of 90° symmetrically above and below the longitudinal axis of the helicopter.

As in the prior art embodiments of a counter-torque device with ducted rotor, the duct may be formed in a fairing incorporated into a tail part of a helicopter comprising the rear end of a tail boom and an empennage with at least one stabilizer, it being possible for the empennage to have two stabilizers and be of a type lying among cross-shaped, T-shaped or V-shaped empennages above the duct, and it being possible for at least one stabilizer of the empennage to include a deflectable stabilizer flap. In addition, the axis of the duct may possibly be inclined to the horizontal direction so that the thrust of the ducted rotor produces a lift component on the helicopter.

Figure 4:
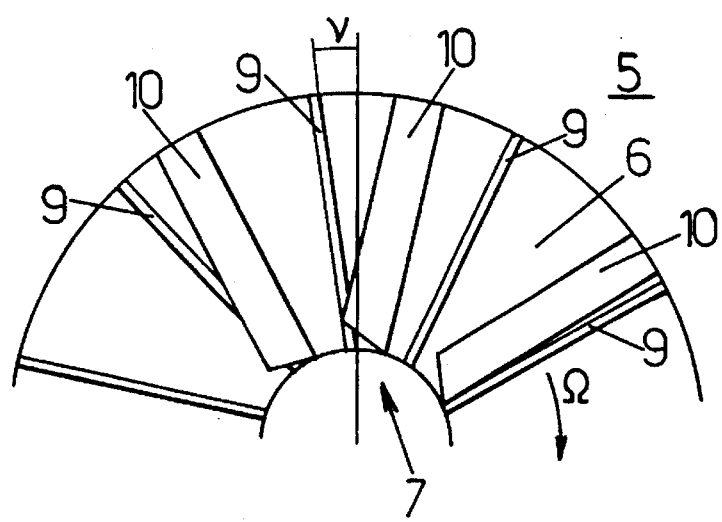

Other advantages and characteristics of the invention will stem from the description given hereinbelow, with no limitation being implied, of embodiment examples described with reference to the appended drawings in which:

FIG. 1 is a ¾ perspective rear view of a ducted counter-torque device with rotor and flow-straightening stator arranged in a duct passing through a fairing at the rear end of the tail boom and at the base of the empennage of a helicopter, the rotor being represented out of the duct with partial cutaway for greater clarity, FIG. 2 is a diagrammatic side elevation of the rotor of FIG. 1 with uneven azimuth modulation of the blades, FIG. 3 is a diagram illustrating the operation of the rotor and of the flow-straightening stator of FIG. 1, FIG. 4 is a partial side elevation of a particular embodiment of the device of FIG. 1, FIG. 5 corresponds substantially to an axial half-section through the counter,torque device of FIG. 1, FIG. 6 represents an axial half-section of the duct of the devices of FIGS. 1, 4 and 5, and FIG. 7 represents diagrammatically, in side elevation, the outlet from the diffuser of the duct and its parts having different radii.

The tail boom 1, shown in FIG. 1, of a helicopter of which the fuselage and single main rotor are not represented supports, at its rear end, an empennage 2, the upper part of which is arranged as a vertical stabilizer 3 for aiding control in terms of yaw, and, at the front of the empennage 2, a horizontal stabilizer with two control surfaces 4 extending on either side of the boom 1, in order to aid the control of the helicopter in terms of pitch.

The base of the empennage 2 is arranged as a shroud or fairing 5, through which there passes a duct 6 for the flow of air for a ducted counter-torque device also comprising a multi-blade variable-pitch rotor 7 mounted so that it can rotate substantially coaxial in the duct 6, as well as a flow-straightening stator 8, fixed in the duct 6 downstream of the rotor 7 with respect to the direction of flow of the airflow passing through the duct 6, and including fixed vanes 9 arranged substantially in star configuration about the axis X—X of the duct 6.

This counter-torque device, which provides for most of the control in terms of yaw in stationary flight or at low speed, is supplemented by the vertical stabilizer 3 and the horizontal stabilizer 4 in order to help with control of the helicopter in terms of yaw and in terms of pitch when travelling at high speed. These same functions may be fulfilled by a V-shaped stabilizer above the fairing 5, or by a cross-shaped empennage, the stabilizer 4 being mounted substantially half way up the vertical stabilizer 3, or even a T-shaped empennage, the stabilizer 4 being mounted at the top end of the stabilizer 3.

The duct 6 exhibits, about its axis X—X substantially transversal to the longitudinal axis of the helicopter, a substantially axisymmetric shape, described hereafter with reference to FIG. 6, and comprising a convergent inlet 19 extended, towards the air outlet, by a cylindrical part 20 itself extended up to the outlet by a divergent nozzle 21-22. The rotor 7 is mounted in the duct 6 on its inlet side and so that its blades 10 rotate in the cylindrical part 20 of the duct 6, the pitch change axes for the blades 10 defining a plane P of rotation of the rotor, in which they move and which is substantially perpendicular to the axis X—X of the shrouded duct 6. The rotor 7 is mounted and rotationally driven on the rear transmission box within the central body 11, of substantially cylindrical external shape and coaxial with the duct 6, and secured to the structure of the empennage 2 by means of the vanes 9 of the flow-straightener 8, which hold the body 11 at the centre of the duct 6 and on its outlet side with respect to the rotor 7.

In a known fashion, the rear transmission box in the body 11 contains a mechanism for rotationally driving the rotor 7 by means of a drive shaft 12, itself driven from a transmission shaft passing through an arm 13 and connected to an auxiliary outlet of the main transmission box of the helicopter, a part of the arm 13 being arranged in the duct 6 substantially in the place of one of the vanes 9 of the flow-straightener 8.

Thus, the rotation of the rotor 7 within the duct 6 creates a guided flow of air which gives rise to the transverse counter-torque thrust necessary for balancing the helicopter in terms of yaw.

In a way which is also well known, in order to vary the amplitude of this transverse thrust, the rear transmission box of the body 11 and the rotor 7 comprise a device for collective control of the pitch of the blades 10, actuated by a control rod which is not represented, because it is assumed that the arm 13 of FIG. 1 acts as a fairing for the transmission shaft and for the collective pitch change rod.

As regards the structure, the configuration and operation of the rear transmission box, of the device for collective pitch control of the blades 10, as well as of the rotor 7, reference will advantageously be made to the French Patent FR 1 531 536 and to the American Patents U.S. Pat. No. 3,594,097 and U.S. Pat. No. 4,626,173 of the Assignee Company, which are incorporated into the present specification by way of reference. We will limit ourselves to recalling that each blade 10 includes a main blade section 14 with aerodynamic profile, a blade root 15 formed as a cuff, via which the blade 10 is mounted so that it can swivel about its longitudinal pitch change axis in at least one bearing formed for this purpose in at least one annular wall of a rotor hub 17, and a twistable, and preferably also flexible, fitting 16 which passes through the blade root cuff 15 and is retained by its opposite end from the cuff 15 on the rotor hub 17, which is rotationally driven by the drive shaft 12 projecting along the axis X—X of the duct 6 on the body 11 surrounding the rear transmission box. The root 15 of each blade 10 exhibits, projecting from one side of the blade 10, a pitch control lever 23 connected by a small rod to a control spider rotating freely with the rotor 7 but capable of translational movement along the axis of rotation of the rotor 7 by operating the pitch control rod in order collectively to control the change in pitch of the blades 10.

The vanes 9, fixed in the duct 6 downstream of the blades 10 of the rotor 7, without however leaving the divergent nozzle 21-22 of the duct 6, recover the rotational energy of the flow of air downstream of the blades 10, by straightening out this flow towards the axis X—X of the duct 6 and procuring a supplementary counter-torque thrust, as explained in French Patent FR-2 534 222 (or U.S. Pat. No. 4,585,341) of the Assignee Company, the description of which is incorporated into the present specification by way of reference, in particular as regards the description of FIGS. 4 and 5 of this Patent, FIG. 5 of which corresponds to FIG. 3 of the present application. In this FIG. 3, two blades 10 of the rotor which rotate with rotational speed u=ΩR have been represented diagrammatically upstream of two stationary vanes 9. This speed u is combined with the axial inlet speed Va1 of the air in order to give a relative speed W1 of the flow of air at the rotor, this latter speed establishing a pressure field around each moving blade 10.

This field then gives rise to an aerodynamic resultant R1 which may, on the one hand, be broken down into a lift force FZ1 and a drag force FX1 and, on the other hand, gives rise to an axial thrust S1 of direction orthogonal to the direction of the speed u of rotation of the rotor, and in the opposite direction to Va1.

As a consequence of the first obstacle constituted by each blade 10 in question, the air leaves the rotor 7 under different speed conditions, and the outlet speeds triangle makes it possible to discern a new speed W2 relative to the rotor, less than W1, and an absolute speed V2 which acts on a stationary vane 9 facing it.

The speed V2 fulfilling, for the stationary vane 9, the same role as did the speed W1 for the moving blade 10, V2 establishes a pressure field around each vane 9, and this field gives rise to an aerodynamic resultant R2 which, on the one hand, is broken down into a lift force FZ2 and a drag force FX2 and, on the other hand, gives rise to an axial thrust S2 which is an additional thrust adding to the thrust S1. Upon leaving the vanes 9, the flow of air is straightened and its speed V3 may be practically axial (parallel to X—X) by a suitable choice of the asymmetric aerodynamic profile of the vanes 9, and in particular their camber and angular setting with respect to the axis X—X of the duct 6.

In a ducted counter-torque device, the arrangement of a flow-straightening stator 8 with profiled stationary vanes 9 downstream of the rotor 7 in the duct 6 makes it possible to produce a compact, balanced and rigid counter-torque device which, without modifying the power required for driving the rotor 7 gives increased counter-torque thrust.

The efficiency of such a counter-torque device is thus linked:

- to the characteristics of the rotor 7, the performance level required to fly the helicopter in terms of heading depending mainly on the choice of diameter of the rotor 7, and therefore of the duct 6, on the peripheral speed of the blades, the number of them, their chord, and on their profile and twist law,
- to the characteristics of the flow-straightener 8, when it exists, and particularly on the number of vanes 9, their chord, their profile (camber, setting, . . . ),
- as well as to the characteristics of the duct 6.

In parallel, acoustic optimization of the ducted counter-torque device is ensured by distributing the acoustic energy over the whole frequency spectrum, by adopting an uneven angular distribution of the blades 10 of the rotor 7, termed azimuth modulation or phase modulation, and by reducing the acoustic energy level emitted by the counter-torque device, by reducing the peripheral speed of the blades 10 of the rotor 7, by reducing the interference between the rotor 7 on the one hand and, on the other hand, the flow-straightening stator 8 and the transmission arm 13 by virtue of a specific configuration and arrangement of these elements within the duct 6, with a suitable separation from the rotor 7.

For a ten-bladed rotor 10, an example of uneven phase or azimuth modulation is represented in FIG. 2. The object of this phase modulation is to disrupt the conventional angular symmetry or conventional equi-angular distribution of the blades of a rotor, in order not to reduce the acoustic energy emitted but to distribute it more favourably over the frequency spectrum, contrary to that which is obtained in the absence of modulation (equi-distributed blades), namely a concentration of the energy over specific frequencies (b $\Omega$, 2b $\Omega$, 3b $\Omega$, . . . ).

The phase modulation law for the blades 10 of the rotor 7 is a sinusoidal law or close to a sinusoidal law of type:

$$\Theta n = n \times 360°/b + \Delta\Theta \sin(m \times n \times 360°/b)$$

where $\Theta n$ is the angular position of the nth of the blades of the rotor counted successively from an arbitrary angular origin, b being the number of blades of the rotor, and m and $\Delta\Theta$ are the parameters of the sinusoidal law corresponding, in the case of m, to a whole number which is not prime with the number b of the blades 10 of the rotor 7 whereas $\Delta\Theta$ is chosen to be greater than or equal to a minimum value $\Delta\Theta$ min chosen as a function of the number of blades b and which decreases as b increases.

It is understood that $n \times 360°/b$ represents the angular position of the nth blade, in an equally distributed configuration, whereas $\Delta\Theta \sin(m \times n \times 360°/b)$ corresponds to the azimuth modulation term with respect to the equally distributed configuration. The parameters m and $\Delta\Theta$ are chosen as a function of the number b of blades 10 in order, at the same time, to provide dynamic balancing of the rotor 7, optimum distribution of the energy over the frequency spectrum, and guarantee a minimal inter-blade angular separation imposed by the conditions of angular excursions of the blades in terms of pitch and structural adherence of the blades 10 to the hub 17.

The whole number m is chosen in the following fashion: it is first of all chosen to respect dynamic balancing of the rotor 7. By writing this balance, the following two equations which have to be satisfied are obtained:

$$\epsilon \cos \Theta n = 0 \text{ and } \epsilon \sin \Theta n = 0$$

For the sinusoidal modulation law $\Theta n$ given hereinabove, these two equations are satisfied if m and b are not prime with each other.

The possible choices for m as a function of the number b of blades 10 varying from 6 to 12 are given by crosses in Table 1 hereinbelow.

TABLE 1

| m b | 6 | 7 | 8 | 9 | 10 | 11 | 12 |
|---|---|---|---|---|---|---|---|
| 2 | X |   | X |   | X |   | X |
| 3 | X |   |   | X |   |   | X |
| 4 | X |   | X |   | X |   | X |

As a function of the possibilities offered in Table 1, the whole number m is as small as possible and preferably fixed to 2 or 3 in order to obtain the densest possible spectrum, and therefore a better distribution of energy per third of an octave. The parameter m may, just about, be equal to 4, but the value of 1 is to be avoided.

The parameter $\Delta\Theta$ must be chosen in the following fashion: it is greater than or equal to a minimum value $\Delta\Theta$ min given by an acoustic criterion for a given number of blades 10 of the rotor, as indicated in Table 2 hereinbelow.

TABLE 2

| b | 6 | 8 | 9 | 10 | 12 |
|---|---|---|---|---|---|
| $\Delta\Theta$ min | 14.34° | 10.75° | 9.55° | 8.60° | 7.17° |

These values correspond to one and the same angular phase shift $\Delta\Phi = b \Delta\Theta$, which comes into play as a parameter of the Bessel functions characterizing the levels of the spectral lines of a sinusoidal modulation, with respect to the fundamental line, as explained in the article entitled "Noise Reduction by Applying Modulation Principles" by Donald EWALD et al., published in "The Journal of the Acoustical Society of America", volume 49, Number 5 (part 1) 1971, pages 1381 to 1385. The angular phase shift $\Delta\Phi = 1.5$ radian corresponds to the value above which the Bessel function Jo ($\Delta\Phi$) is less than or equal to the Bessel functions Jn ($\Delta\Phi$) where n is other than 0 (see FIG. 2 of the abovementioned article). This makes it possible to minimize the emergence of the fundamental in b $\Omega$ with regard to the adjacent lines, because Jo ($\Delta\Phi$) represents the weighting coefficient on the fundamental line, whereas J1 ($\Delta\Phi$) represents that of the adjacent lines (b−1) $\Omega$ and (b+1) $\Omega$, which exist if there is modulation. The angular phase shift $\Delta\Phi$=b $\Delta\Theta$=1.5 radian is the ideal point, because the noise level on the three adjacent lines b $\Omega$, (b−1) $\Omega$ and (b+1) $\Omega$ is identical, the energy concentrated on the line b $\Omega$ for a rotor with equally distributed blades is thus distributed over the three lines. Table 2 thus gives the values of $\Delta\Theta$ min as a function of b, so that b $\Delta\Theta$ min=1.5 radian.

This result corresponds to an ideal case, for which the pressure disturbance function is quite uniform, that is to say for a rotor with a large number of blades (greater than 20). In the case of a counter-torque rotor 7, the relatively lower number of blades 10 renders the pressure disturbance function more impulsive. Also, the above rule may be slightly adapted, which requires variation limits to be defined in order to match the sinusoidal modulation rule to the specific case of a ducted counter-torque rotor 7. In addition, the minimal allowable inter-blade angular separation for enabling the blade angular excursion in terms of pitch without interfering with each other, as well as suitable structural adherence of the blades 10 to the hub 17 may necessitate a choice of $\Delta\Theta$ less than $\Delta\Theta$ min recommended by the acoustic criteria (Table 2). For example, for a rotor 7 with ten blades 10, the minimum inter-blade angular separation is 24°.

A phase modulation law may therefore be adopted, based on a distorted sinusoidal law, for which b $\Delta\Theta$ may be chosen within the range of values extending from 1.5 radian to 1 radian and/or a variation of ±5° about the angular position given initially by the sinusoidal distribution law for each blade 10 of the rotor 7 may be adopted in order to cover the constraint of minimal inter-blade angular separation, whilst retaining good acoustic efficiency due to phase modulation.

It is noted that for b $\Delta\Theta$=1 radian, the weighting coefficient for the fundamental line b $\Omega$ is 0.8 and falls to 0.45 for the adjacent lines (b±1) $\Omega$.

When the counter-torque device comprises the flow-straightener 8, the vanes 9 of which are evenly distributed about the axis X—X of the duct 6, in order to limit the interference between the rotor 7 and the flow-straightening stator 8, and in particular in order to avoid any surge phenomenon (dynamic excitation) between the rotor 7 and the stator 8, the phase modulation of the blades 10 of the rotor 7 is such that any angular separation between two blades 10 of the rotor which are not necessarily consecutive, is different from any angular separation between two not necessarily consecutive vanes 9 of the stator 8. Mathematically, this condition may translate as follows: if $\Theta ij$ represents the angular separation between the blades of order i and j of the rotor 7, counted successively from an arbitrary angular origin, that is to say the angle defined between the pitch change axes of the blades i and j, and if $\Theta k,l$ represents the angular separation between the vanes of order k and l of the flow-straightener 8, then regardless of the values of i, j, k, l, $\Theta i,j$ is different from $\Theta k,l$. In practice, this condition is considered to have been respected if the differences between the respective angular separations of the various blades 10 of the rotor 7 and of the various vanes 9 of the flow-straightener 8 are greater than 1° in absolute values, for at least half of the vanes 9 of the flow-straightener 8, not counting the transmission arm 13.

If this angular condition which prevents two blades 10 from passing simultaneously opposite two vanes 9 is not verified by the choice of phase modulation of sinusoidal type of the most advantageous type mentioned hereinabove, the angular positions of some blades at least must be modified by moving away from the sinusoidal law, and adopting a distorted sinusoidal law as mentioned hereinabove, that is to say, since $\Delta\Theta$ cannot then be chosen such that b $\Delta\Theta$=1.5 radian, then b $\Delta\Theta$ is decreased progressively from 1.5 to 1 radian until a suitable value of $\Delta\Theta$ is obtained to respect the above-mentioned geometric condition $\Theta ij$ which is different from $\Theta k$ l, without dropping below 1 radian, and cumulatively or alternatively a maximum variation of ±5° about the angular position given initially by the sinusoidal distribution law for each blade 10 of the rotor 7 is permitted.

If the decrease in sound nuisance is sought, avoiding simultaneous interactions between two blades 10 and two vanes 9 with a rotor 7, the blades 10 of which are equally distributed, it is sufficient to choose a number b of blades 10 of the rotor 7 which is prime with the number of vanes 9 of the flow-straightener 8, so as not to find an arbitrary angular separation between two not necessarily consecutive blades 10 which is equal to an arbitrary angular separation between two not necessarily consecutive vanes 9.

A decrease in acoustic nuisance due to the interactions between the rotor 7 and the flow-straightening stator 8 is also obtained by decreasing the level of acoustic energy emitted by these interactions, independently of the frequencies on which it is concentrated or distributed. As represented in FIG. 4, in order to avoid the interaction between a blade 10 and a vane 9 from arising simultaneously over the whole span of the vane 9 in question, the vanes 9 are arranged in a non-radial fashion, but are each inclined by an angle v, lying between approximately 5° and approximately 25° to the radial direction, in the opposite direction from the direction of rotation of the blades 10 when considering the vane 9 from the centre of the duct 6 towards its periphery. This direction of the inclination makes it possible not only to reduce the noise of interaction between the blades 10 of the rotor 7 and the vanes 9 of the stator 8, but also to ensure better take up of the loadings withstood by the rear transmission box in the body 11, the vanes 9 operating in compression. In effect, since one of the functions of the flow-straightener 8 is to support the rear transmission box and the body 11, the vanes 9 may thus best take up the reactive torque to the torque transmitted to the rotor 7. In addition, the relative thickness of the aerodynamic profiles of the vanes 9 of the flow-straightener 8 is chosen so as to best reduce the overall size in the duct 6, whilst ensuring sufficient mechanical strength for the function of supporting the body 11 and, in practice, the relative thickness of the profiles of the vanes 9 lies between approximately 8% and approximately 12%.

This choice of relative thickness is compatible with the use, for the vanes 9, of an aerodynamic profile of NACA 65 type, exhibiting an angle of attack setting to the axis X—X of the duct 6 which is negative and lies between approximately 2° and approximately 2.5°, and a camber lying between approximately 20° and approximately 28°, these profile characteristics giving the flow-straightener 8 good efficiency.

Furthermore, the reduction in the noise of interaction between the rotor 7 and the stator 8 becomes significant beyond a minimal axial separation between the leading edge of the vanes 9 of the flow-straightener 8 and the plane P of rotation of the rotor 7, defined by the pitch change axes for the blades 10, at approximately 40% of their chord c, this minimum separation being at least equal to 1.5 c. However, since the support for the rear transmission box and the body 11 in the duct 6 is provided by the flow-straightener 8, in order to give good tolerance on the position of the plane P of rotation of the rotor in the duct 6, it is necessary to fix the flow-straightener 8, the rear transmission box and the body 11 as close as possible to the plane P of the rotor 7.

A good compromise between these two contradictory requirements, that is to say between a reduction in noise and good tolerance on the position of the plane P of the rotor 7, is obtained by inclining the vanes 9 of the flow-straightener 8 by an angle $\Psi$, of approximately 2° to approximately 6°, as represented in an exaggerated manner in FIG. 5. This inclination of each vane 9 at a slant, from the centre of the duct 6 towards its periphery and from upstream to downstream, makes it possible to keep the leading edge of each vane 9 as far away as possible from the plane P of the rotor, whilst preserving correct positioning of the axis of the rear transmission box and of the body 11, and therefore of the plane P of the rotor in the duct 6. Taking account of the progressive nature of the aerodynamic loading between the root of the vane 9, linked to the body 11, and its more loaded end linked to the lateral wall or fairing 18 of the duct 6, the influence on noise remains negligible, despite the leading edge of the vanes 9 coming close behind the root of the blades 10. For these reasons, the axial spacing between the plane P of rotation of the rotor 7 and the leading edge of the vanes 9 of the flow-straightener 8, at the periphery of the duct 6, is a distance dr lying between approximately 1.5 c and approximately 2.5 c, where c is the chord of the blades 10 of the rotor 7, chosen in their main blade section 14, close to the blade root 15, when this chord c is not constant over the span of the main blade section 14.

To sum up, in addition to the angle v of inclination to the radial direction, in a plane perpendicular to the axis X—X of the duct 6 and parallel to the plane P of the rotor, each vane 9 is such that its leading edge is at a distance dr ranging from approximately 1.5 c to approximately 2.5 c away from the plane P of rotation of the rotor, at the periphery of the duct 6, avoiding the trailing edge of the vanes 9 penetrating into the outlet delimited by a rounded lip of this duct 6, and each vane 9 is inclined at a slant by an angle $\Psi$ in a plane perpendicular to the plane P of the rotor, towards the downstream end and towards the periphery of the duct 6, in order to ensure precise positioning of the plane P of the rotor by correct positioning of the body 11 and of the rear transmission box. When dr is less than 1.5 c, the level of radiated acoustic energy increases very rapidly when the vanes 9 are brought close to the plane of rotation P, whereas if dr is greater than 2.5 c, the flow-straightener 8 loses its aerodynamic efficiency.

As already stated, the transmission arm 13 is likened to a vane 9 of the flow-straightener 8 in order to determine the angular positions of the vanes 9 and of the blades 10, but it is not profiled, and the number of profiled vanes 9 is chosen to be greater than or equal to the number of blades 10 of the rotor 7 less one.

These blades 10 advantageously have an aerodynamic profile of the OAF type, with relative thickness and camber which progress along the span, the relative thickness decreasing for example from 13.9% to 9.5% between 0.4 R and R, where R is the radius of the rotor 7. Likewise, the twist on the profile decreases moving away from the axis of the rotor.

As shown in FIG. 6, and as already described, the annular wall 18 of the duct 6 comprises, from upstream to downstream, a convergent inlet nozzle 19, a cylindrical part 20, in which the rotor 7 rotates, as indicated by the plane of rotation P, and a frustoconical divergent nozzle 21 ending in a rounded outlet lip 22. The duct 6 is subdivided into two parts, namely a collector, corresponding to that part of the duct which is situated upstream of the plane of rotation P of the rotor 7, and of axial dimension dc (along the axis X—X of the duct 6), and a diffuser corresponding to that part of the duct 6 which is situated downstream of the plane of the rotor P and of axial dimension dd. The collector itself is subdivided into two zones: the convergent nozzle 19, delimited by an inlet lip or annular wall which is convex towards the upstream end and rounded with constant radius Rc, and a cylindrical zone of length L1 which follows it. The diffuser is divided up into three zones, namely a cylindrical zone of length L2, extending the cylindrical zone L1 of the collector, the frustoconical zone of vertex half-angle $\alpha$ of the divergent nozzle 21, and the divergent outlet nozzle delimited by the outlet lip 22 in the form of an annular wall which is convex towards the downstream end and rounded with radius r.

If $\phi$ indicates the diameter of the duct 6 in its cylindrical part 20, the ratio L1/$\phi$ must lie between approximately 0.02 and approximately 0.08, in order to avoid too large a cylindrical zone L1 greatly distorting the performance of the ducted rotor. Likewise, too small a collector length dc distorts the performance of the ducted rotor so that the minimum length of the collector dc=Rc+L1 corresponds to approximately 10% of the duct diameter $\phi$. Thus (Rc+L1)/$\phi$>0.10.

In practice, the radius Rc of the inlet lip 19 is determined so that its ratio to the duct diameter $\phi$ is approximately 0.08. The position of the plane of the rotor P in the cylindrical part 20 is defined as a function of the chord c of the blades 10, of their positive pitch range, of the distance a separating their leading edge from their pitch change axis (a=0.4 c), and of the maximum deformation f of the blade 10, characterizing its rigidity in terms of flap. L1 must be such that: L1>a sin ($\beta$ max)+f, where $\beta$ max is the maximum positive pitch angle. In order to avoid any overhang of the blade 10 outside and in front of the cylindrical part 20, an additional margin of 1.33% of $\phi$ is taken into account. The length L2 of the cylindrical zone of the diffuser progresses between 1% and 3.5% of the duct diameter $\phi$. In practice, it is given by the following formula: L2<(c−a) sin ($\beta$ max).

The diffusion angle $\alpha$ (vertex half-angle of the frustoconical divergent nozzle 21) is chosen between approximately 5° and approximately 20°. The length df of the divergent part of the diffuser depends directly on the diffusion angle $\alpha$ and is inversely proportional to the diffusion, defined by a level of diffusion corresponding to the ratio of the outlet surface area of the duct 6 to the surface area of the disc of the rotor 7, this diffusion ratio remaining greater than 1.06.

In order to reduce the drag of the ducted counter-torque device in forward flight of the helicopter without distorting its performance in hovering flight, the radius r of the convex annular outlet lip 22 of the diffuser is not constant over the entire periphery of this lip. The zones where the radius r progresses are represented in FIG. 7 showing diagrammatically the outlet of the diffuser in side elevation. In this Figure, the axis Y—Y is the front (to the left)—rear (to the right) or longitudinal axis of the helicopter passing through the axis X—X of the duct 6, and the axis Z—Z is the vertical axis also intersecting the axis X—X of the duct 6. The lip 2 has a small constant radius r1, less than 1.6% approximately of the diameter $\phi$ of the duct 6, in a front zone extending over the circular arc AA corresponding to a subtended angle of 210° and symmetrically with respect to the axis Y—Y. In order not to distort the thrust provided by the ducted counter-torque device, while reducing its drag in forward flight, the lip 22 has a radius r2>r1 and lying between approximately 4.3% of the diameter φ of the duct and the radius Rc chosen for the convergent nozzle 19 in a rear zone extending over the arc BB corresponding to a subtended angle of 90°, symmetrically on either side of the axis YY. Between these front and rear zones there extend two zones with progressive radius between r1 and r2 and corresponding to the arcs AB each subtended by an angle of 30°. These zones of progressive radius, which are necessary for reasons of manufacturing constraint, provide the transition between the front and rear parts of the outlet lip 22. As a variant, the front zone of small radius r1 may extend over the arc A'A' corresponding to a subtended angle which may reach 240°. The transition zones corresponding to the arcs A'B are then shorter.

In an example suitable for equipping a helicopter with a mass of the order of 1.5 tonnes, the counter-torque device is ducted in a duct 6 of 750 mm diameter, with a rotor having 8 metal blades with a finned main blade section 14 and an integral cuff 15, and as described in U.S. Pat. No. 3,594,097, the diameter of the rotor hub being 304 mm, the chord of the blades 58 mm or 63 mm depending on whether the blade tip speed is 186 m/s or 180 m/s, the range of pitch of the blades extending from −25° to +41° at 0.7 R (R is the radius of the rotor), and the profile of the blades being a progressive OAF profile as mentioned above, with a twist law decreasing from 17° to 6.9° from 0.4 R to R.

Associated with a flow-straightener with ten profiled vanes 9 of 80 mm chord to which is added the transmission arm 13 [ten inter-vane angular separations of 30.66° and one angular separation of 53.4° through which the arm 13 passes], the rotor with eight blades 10 exhibits phase modulation of the blades according to the optimal sinusoidal law (b ΔΘ min=1.5 radian), of which the parameters are m=2 and ΔΘ=10.75°, but in order to take account of the flow-straightener 8, the optimal law is distorted by maximum angular variations of ±3.75°, which leads to the following modulation of the eight blades 10 of the rotor 7.

| n  | 1    | 2    | 3    | 4    |
|----|------|------|------|------|
| Θn | 55°  | 92°  | 128° | 180° |
| n  | 5    | 6    | 7    | 8    |
| Θn | 235° | 272° | 308° | 360° |

In contrast, associated with a flow-straightener with seven profiled vanes 9 plus the transmission arm 17, the rotor with eight blades 10 exhibits phase modulation according to a distorted sinusoidal law (b ΔΘ=1.25 radian) of which the parameters are m=2 and ΔΘ=8.96° with maximum angular variations of ±5°, which gives the following modulation:

| n  | 1   | 2   | 3    | 4    | 5    | 6    | 7    | 8    |
|----|-----|-----|------|------|------|------|------|------|
| Θn | 56° | 93° | 131° | 180° | 236° | 273° | 311° | 360° |

The inclination ν of the vanes 9 to the radial direction passing through the base of each of them is of the order of 10° and their angle of slant Ψ towards the periphery and towards the outlet of the duct 6 is 4°. The distance dr separating the plane of rotation P of the rotor from the leading edge of the vanes 9 is 96.5 mm, i.e. approximately 1.53 times to 1.66 times the chord of the blades of the rotor. The profiled vanes 9 of the flow-straightener have a profile of NACA 65 type with a relative thickness of 10%, a camber of the mid-line of the profile of 27°, and an angle of attack setting to the axis X—X of the duct 6 which is negative and equal to 2.5°. This duct has a convergent nozzle 19, of which the radius Rc is 60 mm, the length L1 of the cylindrical zone of the collector is 24 mm, the length L2 of the cylindrical zone of the diffuser is 23 mm, the divergence angle α is 7°, and the outlet lip 22 has a radius r1 of 10 mm on the front zone and a radius r2 of 45 mm on the rear zone, the minimal length of the divergent part of the diffuser df being 187 mm.

In an example suitable for equipping a helicopter with a mass of approximately 2.5 tonnes, the counter-torque device comprises a rotor of 10 blades with a chord of 50 mm, driven at a peripheral speed of 187.66 m/s (3584 rpm) with a hub of diameter 380 mm, housed in a duct of 1 m diameter. The profile of the blades is an OAF profile similar to that of the preceding example, and the range of pitch extends from −25° to +35° (at 0.7 R). The blades, which are of a metal type as in the preceding example, exhibit phase or azimuth modulation given by the aforementioned sinusoidal law but distorted (b ΔΘ=1 radian) of which the parameters are m=2 and ΔΘ=5.73° with maximum angular variations of ±3.4°. The flow-straightener includes ten profiled vanes with a chord of 97 mm, to which is added the transmission arm 13. This leads to the following modulation:

| n  | 1      | 2      | 3      | 4      | 5    |
|----|--------|--------|--------|--------|------|
| Θn | 44.9°  | 77.5°  | 102.5° | 135.1° | 180° |
| m  | 6      | 7      | 8      | 9      | 10   |
| Θn | 224.9° | 257.5° | 282.5° | 315.1° | 360° |

The angle of slant Ψ of the profiled vanes is 4° and their inclination ν to the radial direction is 7.8°. The distance dr between the plane P of the rotor and the profiled vanes 9 is approximately 98 mm, namely approximately 1.96 times the chord c of the blades. The vanes 9 of the flow-straightener have a profile of NACA 65 type with 10% relative thickness, with a camber of 21° for the mid-line of the profile, and an angle of attack setting which is negative and equal to 2.5°. The radius Rc of the convergent inlet nozzle of the duct 6 is 80 mm, and the lengths L1 and L2 are respectively 23 mm and 17 mm for the cylindrical zones of the collector and of the diffuser respectively. The divergence angle α is 7° and the minimal length df of the divergent part of the duct is 280 mm. The radius r1 of the front zone of the lip 22 is 10 mm whereas its radius r2 on the rear zone is 60 mm.

In order to equip a helicopter with a mass of the order of 4 to 4.5 tonnes, an example of a counter-torque device may comprise a rotor with ten blades with a chord of 94 mm, driven with a peripheral blade tip speed of 180 m/s (3125 rpm) in a duct 1100 mm in diameter, the radius of the hub being 225 mm. As in the preceding examples, the pitch change axis for the blades is at 40% of their chord c, and their profile is a progressive OAF profile with the same law of variation in relative thickness, but a twist law which decreases from 7.25° to −1.2° between 0.4 R and R. The flow-straightener comprises either 13 vanes, namely 12 profiled ones with a chord of 80 mm to which the transmission arm is added, or 17 vanes, namely 16 profiled ones with a chord of 66 mm and to which the transmission arm is added. The profile of the profiled vanes is a profile of NACA 65 type with 10% relative thickness, a camber of 23° and an angle of attack setting which is negative and equal to 2.2°. The angle Ψ of inclination at a slant of the profiled vanes is 3° and their angle ν of inclination to the radial direction is 11.2°. The distance dr between the plane P of the rotor and the leading edge of the vanes is from 1.65 c to 1.7 c and the application of the distorted sinusoidal law mentioned hereinabove in order to obtain phase modulation leading to no angle between two arbitrary blades being equal to any angle between two arbitrary vanes, leads to the angular distribution of the 10 blades of the rotor given in Table 3 hereafter depending on whether the flow-straightening stator comprises 13 or 17 vanes.

TABLE 3

| n | Θn stator: 13 | Θn stator: 17 |
|---|---|---|
| 1 | 45.7° | 33.5° |
| 2 | 77° | 77° |
| 3 | 103° | 120.5° |
| 4 | 134.3° | 154° |
| 5 | 180° | 180° |
| 6 | 225.7° | 213.5° |
| 7 | 257° | 257° |
| 8 | 283° | 300.5° |
| 9 | 314.3° | 334° |
| 10 | 360° | 360° |

FIG. 2 represents the rotor having the angular distribution indicated in Table 3 above for a flow-straightening stator with 13 vanes.

We claim:

1. Counter-torque device for a helicopter, comprising a variable-pitch multi-blade rotor mounted so that it can rotate substantially coaxially in a duct for a flow of air of axis substantially transversal to the helicopter and passing through a fairing incorporated into the tail part of the helicopter, so that the pitch change axes of the blades move in a plane of rotation substantially perpendicular to the axis of the fairing duct, the blades of the rotor having an angular distribution about the axis of the rotor with an uneven azimuth modulation, wherein the azimuth modulation of the blades is substantially given by the following sinusoidal law:

$$\Theta n = n \times 360°/b + \Delta\Theta \sin(m \times n \times 360°/b)$$

where Θn is the angular position of the nth of the blades counted in series from an arbitrary origin, b is the number of blades, m is a whole number chosen from 1 to 4, which is not prime with the number b of blades, chosen from 6 to 12, and ΔΘ is chosen to be greater than or equal to a minimum value ΔΘ min, which is such that the product ΔΘ min×b is chosen within a range of values extending from 1.5 radian to 1 radian.

2. Counter-torque device according to claim 1, wherein the azimuth modulation corresponds substantially to a distorted sinusoidal law, for which the angular position of at least one blade of the rotor varies by a maximum of ±5° with respect to the angular position fixed by the sinusoidal law.

3. Counter-torque device according to claim 1, wherein it additionally comprises a flow-straightening stator fixed into the duct downstream of the rotor and including stationary vanes located substantially in a star configuration about the axis of the duct and each exhibiting an asymmetric aerodynamic profile, of which the camber and the angular setting with respect to the axis of the duct are such that the vanes straighten out the airflow downstream of the rotor substantially parallel to the axis of the duct.

4. Counter-torque device according to claim 3, wherein the vanes of the flow-straightener are distributed substantially evenly about the axis of the duct, and any angle between two arbitrary blades of the rotor is different from any angle between two arbitrary vanes of the flow-straightener.

5. Counter-torque device according to claim 3, wherein the vanes of the flow-straightener are each inclined to the radial direction, from the axis of the duct towards its periphery, and in the opposite direction from the direction of rotation of the rotor.

6. Counter-torque device according to claim 3, wherein the vanes of the flow-straightener are inclined at a slant, from the centre of the duct to its periphery and from upstream to downstream of the duct.

7. Counter-torque device according to claim 3, wherein the spacing, along the axis of the duct, between the plane of rotation of the rotor and the leading edge of the vanes of the flow-straightener, at the periphery of the duct, is a distance lying between 1.5 c and 2.5 c, where c is the chord of the blades of the rotor.

8. Counter-torque device according to claim 3, wherein the vanes of the flow-straightener support inside the duct a body which is substantially coaxial with the duct, and containing members for driving the rotor and members for collectively controlling the pitch of the blades of the rotor, which is mounted so that it can rotate on the body.

9. Counter-torque device according to claim 3, wherein the vanes of the flow-straightener have an aerodynamic profile of the NACA 65 type, with a relative thickness lying between approximately 8% and approximately 12%, an angle of attack setting to the axis of the duct which is negative and lies between approximately 2° and approximately 2.5°, and a camber lying between approximately 20° and approximately 28°.

10. Counter-torque device according to claim 3, wherein a transmission arm, transmitting a driving power to the rotor, is located inside the duct substantially at the location of one of the vanes of the flow-straightener, the profiled vanes of which are a number at least equal to the number of the blades of the rotor, decreased by one.

11. Counter-torque device according to claim 1, wherein the blades of the rotor have an aerodynamic profile of OAF type, with a relative thickness and camber which are progressive depending upon the span, the relative thickness decreasing from approximately 13.9% to approximately 9.5%, and the twist decreasing from approximately 17° to approximately 6.9° or from approximately 7.25° to approximately −1.2°, between 0.4 R and R, where R is the radius of the rotor.

12. Counter-torque device according to claim 1, wherein the duct comprises two parts, one of which is a collector, corresponding to that part of the duct which is situated upstream of the plane of rotation of the rotor, and the other of which is a diffuser corresponding to that part of the duct which is situated downstream of the plane of rotation of the rotor, the collector comprising a convergent inlet nozzle, delimited by an annular wall which is convex towards the upstream end and rounded with a constant radius, and which is extended towards the plane of rotation of the rotor by a cylindrical zone of a first length (L1), and the diffuser comprising, from the plane of rotation of the rotor towards the downstream end, a cylindrical zone of a second length (L2), extending the cylindrical zone of the collector, then a frustoconical divergent nozzle of vertex half-angle α, and a divergent outlet delimited by an annular wall which is convex towards the downstream end and rounded with radius.

13. Counter-torque device according to claim 12, wherein the position of the plane of rotation of the rotor in the cylindrical part of the duct, which part is formed by the cylindrical zones of the collector and of the diffuser is defined as a function of the chord (c) of the blades of the rotor, of their positive pitch range, of the distance (a) between their leading edge and the pitch change axis, and the maximum deformation (f) of the blade, characterizing its rigidity in flap, so that the lengths L1 and L2 of the cylindrical zones are such that: L1>a sin (β max)+f and L2<(c−a) sin (β max), where β max is the maximum positive pitch angle of the blades of the rotor.

14. Counter-torque device according to claim 12, wherein the length (L1) of the cylindrical zone of the collector lies between approximately 2% and approximately 8% of the diameter (φ) of the duct measured in its cylindrical part, the constant radius (Rc) of the inlet convergent nozzle of the collector is approximately 8% of the diameter (φ) of the duct and the length (L2) of the cylindrical zone of the diffuser progresses between approximately 1% and approximately 3.5% of the diameter (φ) of the duct.

15. Counter-torque device according to claim 12, wherein the vertex half-angle (α) of the frustoconical divergent nozzle is chosen between approximately 5° and approximately 20°.

16. Counter-torque device according to claim 12, wherein the annular wall of the divergent outlet nozzle of the diffuser has a first constant radius (r1) less than approximately 1.6% of the diameter (φ) of the duct, over a circular arc (AA) extending towards the front of the helicopter, a second constant radius (r2), lying between approximately 4.3% of the diameter (φ) of the duct and the radius (Rc) chosen for the convergent nozzle (19) of the collector, over a circular arc (BB) extending towards the rear of the helicopter, and two zones (AB) with progressive radius progressing between r1 and r2 joining together the zones of constant radius (r1 and r2) symmetrically on either side of a longitudinal axis (YY) of the helicopter.

17. Counter-torque device according to claim 16, wherein the front zone of constant radius (r1) extends over a circular arc (AA) corresponding to a subtended angle of at least 210°, and the rear zone of constant radius (r2) extends over a circular arc (BB) corresponding to a subtended angle of 90°, symmetrically above and below the said longitudinal axis (YY) of the helicopter.

18. Counter-torque device according to claim 1, wherein the duct is formed in a fairing incorporated into a helicopter tail part comprising the rear end of a tail boom and an empennage with at least one stabilizer.

* * * * *